United States Patent [19]

Weinzierl et al.

[11] Patent Number: 4,819,034
[45] Date of Patent: Apr. 4, 1989

[54] METHOD AND MICROFILM CAMERA FOR DETECTING CODES APPLIED TO ORIGINAL COPIES IN THE CAMERA

[75] Inventors: Manfred Weinzierl, Pfaffenhofen; Eberhard Zieran, Gruenwald, both of Fed. Rep. of Germany

[73] Assignee: Agfa-Gevaert AG, Leverkusen, Fed. Rep. of Germany

[21] Appl. No.: 159,836

[22] Filed: Feb. 24, 1988

[30] Foreign Application Priority Data

Mar. 5, 1987 [DE] Fed. Rep. of Germany ....... 3706992

[51] Int. Cl.$^4$ .............................................. G03B 27/52
[52] U.S. Cl. ........................................ 355/41; 355/64; 355/77
[58] Field of Search ...................... 355/40, 41, 68, 77, 355/54, 64; 354/109

[56] References Cited

U.S. PATENT DOCUMENTS

| | | | |
|---|---|---|---|
| 4,116,560 | 9/1978 | Dragani et al. | 355/41 |
| 4,577,956 | 3/1986 | Klostahuber et al. | 355/40 |
| 4,757,352 | 7/1988 | Weinzierl et al. | 355/40 |

Primary Examiner—L. T. Hix
Assistant Examiner—David M. Gray
Attorney, Agent, or Firm—Michael J. Striker

[57] ABSTRACT

A method and a microfilm camera for detecting codes applied to original copies being screened in the camera in which a code reader detects the codes, and a counter and comparison device is provided, which is connected to the code reader and is adjusted to a predetermined number of the copies. Two intermediate memories are connected to the counter and comparison device. The memories count and store marks for the blip types and codes from the code reader, respectively. The code value, the blip mark value and the copy number value are compared in the counter and comparison device and when coincide, a copy supply which was previously stopped is switched on again.

3 Claims, 1 Drawing Sheet 4,819,034

METHOD AND MICROFILM CAMERA FOR DETECTING CODES APPLIED TO ORIGINAL COPIES IN THE CAMERA

BACKGROUND OF THE INVENTION

The present invention relates to a method for detecting codes applied to copies being screened in a microfilm camera and a corresponding microfilm camera.

Methods for detecting codes applied to the copies being screened normally comprise a code reader which reads various blips applied to the film and corresponding to various images of the original copies.

A method and a microfilm camera of the type under consideration have been disclosed, for example in DE-PS No. 33 03 647. In this method, blips applied to the microfilm are continually counted and the so-produced image numbers correspond to the code corresponding to the image on the original copy, whereby the code is examined, and the image reception or further processing are carried out when the accuracy of the codes is proven. When the copy having no code or unknown or erroneous code enters the microfilm camera the screening process is interrupted. It is not possible to screen selectively coded and uncoded original copies and to apply blips of various types or no blips to the film at will. Further, the speed of the screening is also limited by the continual counting of the blips and the direct correspondence of the counter outputs to individual original copies or their codes and addresses and not only by the stopping of the camera during the processing of uncoded or falsely-coded copies.

SUMMARY OF THE INVENTION

It is an object of the present invention to provide an improved method and a microfilm camera for detecting codes applied to original copies screened in said microfilm camera.

It is another object of the invention to provide a method for detecting codes applied to original copies, which would ensure that, with selectively coded and uncoded or incorrectly coded copies, the processing of such copies in the microfilm camera would be carried out with greater speed without interruptions, and individual microfilm images with or without blips of different types would be picked up.

These and other objects of the invention are obtained by a method for detecting codes applied to original copies being screened in a microfilm camera provided with a code reader and an illumination station at which different blips corresponding to individual images of the copies are applied to a film, the method comprising the steps of providing counter and comparison means which are adjusted to a predetermined number of copies; counting by said counter and comparison means copies processed in the microfilm camera prior to a stop of copy transport means and copy feeding means at said camera, and stopping by said counter and comparison means said copy feeding means when said predetermined number is reached; providing a first intermediate memory; detecting present, non-present, and incorrect codes by said code reader, feeding said detected codes to said first intermediate memory in which said codes are stored and counted, providing a second intermediate memory which stores for each image on the film an exposed blip type formed as an ASCII-mark, said second intermediate memory counting ASCII-marks, feeding a counted number output from each intermediate memory to said counter and comparison means and comparing said number outputs with an entire number of said ASCII-marks and an entire number of code readings from said code reader; providing a computer including an interception block and presenting at said interception block intermediate memory values in lines if said number of copies coincide with said number of code readings and with said number of ASCII-marks, and after processing said intermediate memory values through said computer, again releasing said copy transport means and copy feeding means.

The method may comprise the step of providing a keyboard and at least a warning and error indicator device or an indicator field wherein, upon reaching a predetermined number of copies in said counter and comparison means and for different intermediate memory values, said warning and error indicator device is released.

The objects of the invention are also obtained by a microfilm camera for detecting codes applied to original copies being screened in the camera, comprising means to feed copies into the camera; means to transport copies in the camera; an illumination device at which different blips corresponding to individual images of the copies are applied to a film; a code reader for reading present, non-present and incorrect codes on said copies; a first intermediate memory for storing and counting codes detected by said code reader; a second intermediate memory for storing and counting ASCII-marks for blip types; computer means with an interception block; and counter and comparison means connected to said first and second intermediate memory, respectively and to said interception block, said counter and comparison means being adjustable to a predetermined number of copies, said counter and comparison means counting copies processed in the camera and stopping said feeding means and said transport means when said predetermined number has been reached and comparing outputs from said first intermediate memory and said second intermediate memory with each other and with said predetermined number, said interception block receiving said outputs and said predetermined number, when they coincide, and said computer processing further all three values in lines.

Due to the storing of the values from the code reader in the first intermediate memory the non-existent or false codes are also stored and counted while ASCII-marks for blip types (also for non-applied blips) are stored and counted in the second intermediate memory. These counted values are compared with the predetermined number of copies processed through the camera so that the entire screening takes place with no interruptions of the process even with non-coded or incorrectly coded original copies, and no retardation of the process due to blip numbers or arrangements of the codes takes place. As long as, for large groups, for example fifty copies, all three counted values coincide with each other a non-disturbed, practically continual screening is possible. The lack of copies can later be recognized and corrected in the computer. Considerable function disturbances, such as defects on the code reader or blip-exposure device or lines to the memories lead to switching the camera off after processing of the predetermined number of respective copy packs.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing schematically illustrates a microfilm camera according to the invention.

DETAILED DESCRIPTION OF THE PREFERRED EMBODIMENT

Figure 1:
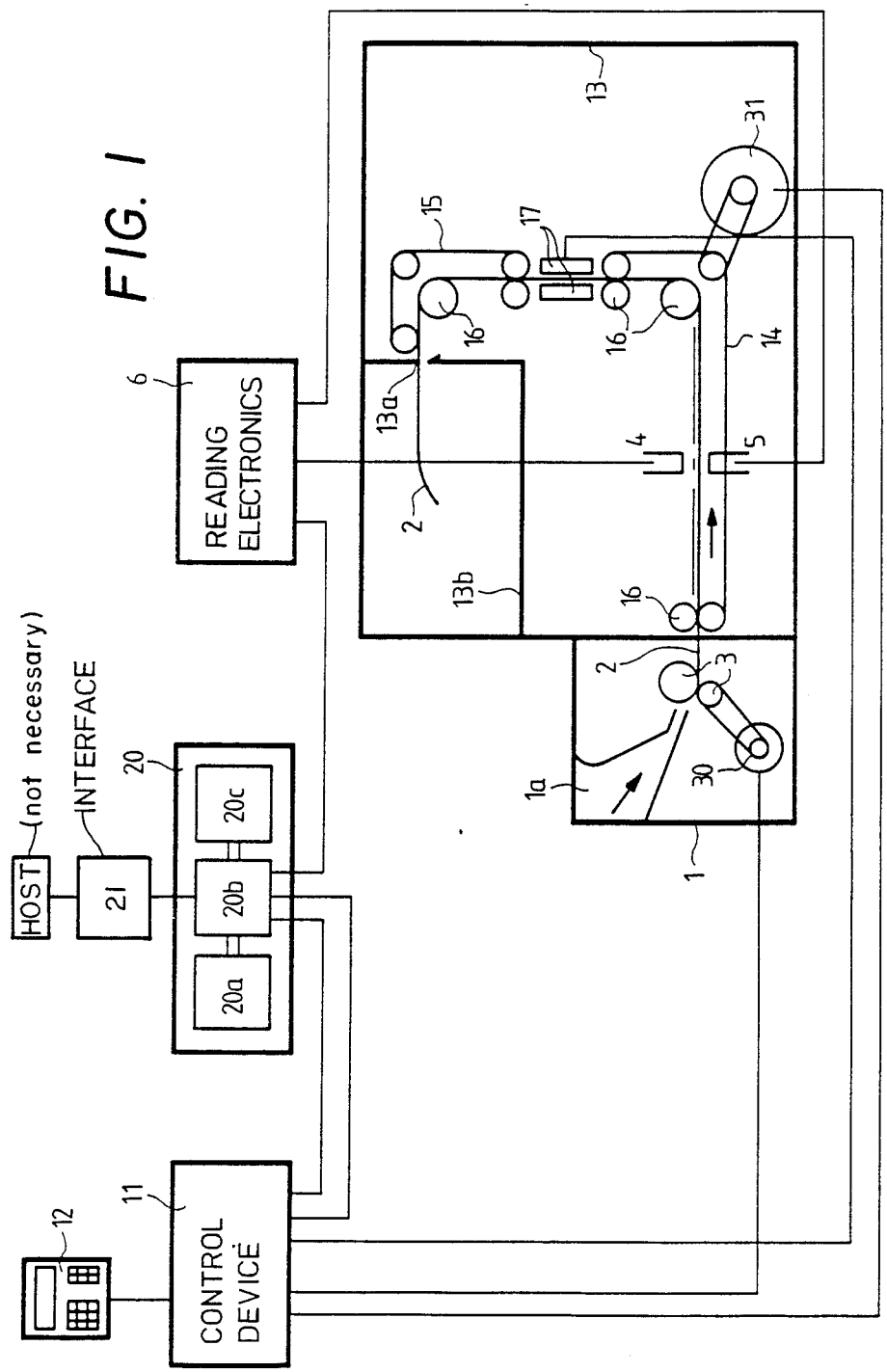

Refering now to the drawing in detail it will be seen that a microfilm camera comprises two mechanical groups of structural assemblies 1 and 13, the components of which are electrically driven and electrically controlled.

A device 1 for supplying copies is positioned closer to the user and serves to insert copies 2 to be screened into a microfilm camera 13. Device 1 includes an inlet compartment or chute 1a for original copies 2 and at least one transport roller pair 3 which grips the original copy 2 and transports the same into the camera 13. In place of the inlet chute a staple or pile device can be used, by means of which original copies are automatically pulled into device 1. When the apparatus is switched on by means of a non-shown conventional main switch transport roller pair 3 is set in rotation by a drive 30. This drive is connected to an electronic control device 11 which will be described herein below. Drive 30 is switched on and off by this control device 11. Each original copy is transported through a control gap between the copy supplying device 1 and the microfilm camera 13. The microfilm camera 13 includes a code reader which is composed of a code reading optics 4, a control light limiter 5 and a reading electronic group 6. A suitable, conventional but non-shown microfilm receiving camera with an objective and a film drive is positioned in the group of structural components designated at 13. Schematically shown within the camera 13 is an illumination station 17 for copies 2. The present invention is not concerned with the illumination station which is therefore is shown only schematically. The illumination station 17 however also includes an exposure device for blips. Pulling conveyors or belts 14, 15 with counter rollers 16 and guiding surfaces positioned therebetween serve to transport original copies 2. A drive 31 for the pulling belt 14 is also connected with the control device 11. The pulling belt 14 is deflected by 90° to extend upwardly before the illumination station 17. The transport belt 15 is also deflected by 90° so that the exposed original copy 2 is turned again by 90° and leaves camera 13 through a discharge gap 13a. Exposed originals 2 can be collected on a collecting desk 13b. The camera 13 can have a number of cover plates or removable wall portions through which the camera components, transport elements and control elements are accessible for operating and repairing purposes. The camera is formed in the exemplified embodiment so that original 2 is transported through the illumination station further.

It is normal to expose a blip of individual microimages during the illumination of the original copy 2. The advancing image numerals of respective blips are regularly positioned one under another. When a new numeral range starts it is distinguished on the film by another blip type, for example a longer one. The pickup range corresponding to another blip type is then marked by hand or a control card within a blip range is provided. It is necessary then to set the start of another staple portion either by hand by means of a keyboard 12a or by a respective control card.

Then it is normal to apply codes to individual images or also originals, for example so-called bar codes which can be provided by a computer. These codes can serve to show the arrangement of the originals for individual experts or customers. The code reader optical device 4 detects each original in accordance with the code and issues a signal indicative of the read code as well as an error of the code on the original, which signal is transmitted to the reading electronics 6.

The known device however can not control the regular running of originals or control cards passing from the reading optics 4 through the pickup camera portion for controlling the blip-exposure in correspondence with the reader device. This disadvantage has been avoided by the present invention. Difficulties reside in that the same original or control card passes the code reader 4, 5 and the illumination station at different times. It must be ensured that both devices register each original.

In order to obtain, in the device of the exemplified embodiment shown in the drawing, that each quickly running original 2 or a control card pass through both devices 4, 5 and 17 without being mixed up with preceding or subsequent originals, the control device 11 for the camera and the reading electronics 6 are designed in a special fashion and connected to a specially designed monitoring unit 20. The monitoring unit 20 includes a counter and comparator device 20b which is connected to an intermediate memory 20a for the camera or the blip-exposing unit, and an intermediate memory 20c for the code reader.

The counter and comparator device 20b is connected to the control device 11 for the camera and the reading electronics 6 and stores the number of values contained therein in accordance with respective intermediate memories 20a or 20c in order to call the values from that number again and to compare two values from the code reader and on the originals, from the camera. This comparison can take place when the counter and comparator device 20b determines a coincidence between the pre-adjusted comparison rate and the detected original.

The transport means in the supply device 1 and the camera portion 13 are connected to the control device 11. The illumination station 17 and keyboard 12 are also connected to the control device 11. The keyboard 12 can, at the same time, have pilot lights for camera functions. The electronic reader 6 is connected to the code reader 4 and control light limiter 5. Reference numberal 21 designates an interface block.

The mode of operation of the microfilm camera according to the invention is as follows:

If an original is moved to the control light limiter 5 the passing of the original through this light limiter is detected by the reading electronics 6. Thereby the code reader 4 is actuated, which reads the code and the signal corresponding to the code (present or non-present) is delivered via the reading electronics 6 to the counter and comparator device 20b. The latter counts the original copy, compares the output with the pre-adjusted comparison rate and sends detected codes and/or non-present codes further to the intermediate memory 20c. Then the original copy is transported into the illumination station 17. Here the control device 11 for the camera will control that a pre-selected blip mark on the film together with a micro-image be exposed. The pre-selected blip mark can also show if the original copy receives no blip. Further, the control device 11 transmits a so-called ASCII-mark for each blip type, also for an erroneous blip, to the counter and comparator device 20a and further into the second intermediate memory 20a.

If now the original copy is differently screened, each detected code and/or non-present code is transmitted to the intermediate memory 20c and a respective ASCII-mark is transmitted to the intermediate memory 20 until the counter and comparator device 20b determines a coincidence between the pre-adjusted comparison rate and the original being detected. Upon the admission of this event, the counter and comparison device 20b stops the drive 30 of the original copy supply 1 by the control device 11 for the camera. After a waiting time which ensures that all present original copies have been moved through the discharge gap 13a towards the collecting desk 13b the counter and comparison device 20b holds the entire number of code readings (present and non-present codes) and compares two whole numbers with the number of detected original copies. If these three numbers are the same it is ensured that each counted original copy supplies the information from the code reader 4, 5, 6 and a mark corresponding to the blip.

The intermediate storage values (for codes and blip types) are available in the table provided at the counter and comparison device 20b. Timely offset informations about the codes and blip types of one and the same original copy are now combined and put in order in one line of the table by a geometric position of the code reader 4 and illumination station 17. The values can, for example be collected in numbers at the interface block 21 of the computer and processed further.

After the receiving of the data the computer will again switch on the copy feeding drive 30, via the interface block 21, counter and comparison device 20b and control device 11.

It has been recognized that the described control device for an orderly processing of original copies 2 and/or added control cards or for an orderly correspondence of the codes and blip types to copies 2 and the microfilm through the microfilm camera with the code reader is used in many fashions, namely with a fully automatic drive, with a partial or exclusive control of the camera through the keyboard 12, with an automatic copy supply from the staples or staple portions or, also, with the feeding of the copies into the camera by hand. In the latter case the feeding process of copies and/or control cards is merely slower. All these fashions of operation have in common that a determined original copy releases the information at the code reader 4, 5, 6 (detected code and/or non-available code) and a further information at the illumination station, and both informations are input via respective circuits 11 or 6 into the corresponding intermediate memories 20a or 20c, are for comparison with each other, called by the counter and comparison device 20b in accordance with a given copy number, and compared with one another. If the counter and comparison device 20b determines a coincidence of the whole number of the codes with the whole number of the blip marks and the number of the detected copies such data are received by the computer which switches on the drive 30 of the copy supply device. If, upon the comparison of the afore-described informations, no coincidence of three final numbers is determined an error can be discovered, for example with the aid of the table and screened copies. A further procedure of an error discovery or error treatment is exclusively specific.

The user can inquire further informations or define commands at the camera by the interface block 21, from the control device 11 for the camera and via the counter and comparison device 20b. Furthermore, the control device 11 of the camera can automatically detect, by means of the counter and comparison device 20b and interface block 21 various conditions and occurrences at the camera.

It will be understood that each of the elements described above, or two or more together, may also find a useful application in other types of methods for detecting codes applied to copies processed in a microfilm camera differing from the types described above.

While the invention has been illustrated and described as embodied in a method for detecting codes applied to copies processed in a microfilm camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for detecting codes applied to original copies being screened in a microfilm camera provided with a code reader and an illumination station at which different blips corresponding to individual images of the copies are applied to a film, the method comprising the steps of providing counter and comparison means which are adjusted to a predetermined number of copies; counting by said counter and comparison means copies processed in the microfilm camera prior to a stop of copy transport means and copy feeding means at said camera and stopping by said counter and comparison means said copy feeding means when said predetermined number is reached; providing a first intermediate memory; detecting present, non-present, and incorrect codes by said code reader, feeding said detected codes to said first intermediate memory in which said codes are stored and counted, providing a second intermediate memory which stores for each image on the film an exposed blip type formed as an ASCII-mark, said second intermediate memory counting ASCII-marks, feeding a counted number output from each intermediate memory to said counter and comparison means and comparing said number outputs with an entire number of said ASCII-marks and an entire number of code readings from said code reader, providing a computer including an interface block and presenting at said interface block intermediate memory values in lines if said number of copies coincide with said number of code readings and with said number of ASCII-marks, and after processing said intermediate memory values through said computer again releasing said copy transport means and copy feeding means.

2. The method as defined in claim 1, comprising the step of providing a keyboard and at least a warning and error indicator device or an indicator field wherein, upon reaching a predetermined number of copies in said counter and comparison means and for different intermediate memory values, said warning and error indicator device is released.

3. A microfilm camera for detecting codes applied to original copies being screened in the camera, comprising means to feed copies into the camera; means to transport copies in the camera; an illumination device at which different blips corresponding to individual images of the copies are applied to a film; a code reader for reading present, non-present and incorrect codes on said copies;

a first intermediate memory for storing and counting codes detected by said code reader; a second intermediate memory for storing and counting ASCII-marks for blip types; computer means with an interface block; and counter and comparison means connected to said first and second intermediate memory, respectively and to said interface block, said counter and comparison means being adjustable to a predetermined number of copies, said counter and comparison means counting copies processed in the camera and stopping said feeding means and said transport means when said predetermined number has been reached and comparing outputs from said first intermediate memory and said second intermediate memory with each other and with said predetermined number, said interface block receiving said outputs and said predetermined number, when they coincide, and said computer processing further all three values in lines to issue a signal for starting said means to feed copies into the camera when said outputs and said predetermined number coincide.

* * * * *